Dec. 17, 1963 G. R. GUNTHER-MOHR ETAL 3,114,195

ELECTRICAL CONTACT FORMATION

Filed Dec. 28, 1961

INVENTORS
GERARD R. GUNTHER-MOHR
NICHOLAS N. WINOGRADOFF

BY John F. Ohlandt Jr.
ATTORNEY

United States Patent Office 3,114,195

Patented Dec. 17, 1963

3,114,195

ELECTRICAL CONTACT FORMATION

Gerard R. Gunther-Mohr, Chappaqua, N.Y., and Nicholas N. Winogradoff, Rockville, Md., assignors to International Business Machines Corporation, New York, N.Y., a corporation of New York Filed Dec. 28, 1961, Ser. No. 162,724
2 Claims. (Cl. 29—155.55)

This invention relates to the formation of contacts on electrical devices and, more particularly, to the formation of ohmic contacts onto such materials as the oxides and sulfides of some metals, such as $GeO_2$, $TiO_2$ and CdS, as well as a wide variety of semiconductors and insulators.

It has been found extremely difficult in the art to make good and mechanically robust electrical contacts to some of the wider band gap materials such as the oxides and sulfides of some metals. The present invention is principally based upon the chemical reduction of thin surface layers of such materials by exposure to hydrogen. For example, where the material is $GeO_2$, the reduction process leads to the formation of semiconducting surfaces of germanium to which leads are soldered in the usual manner so as to yield the requisite ohmic contacts.

Accordingly, it is an object of the present invention to enable the simple formation of stable electrical contacts to certain wide band gap materials.

A further object is to obtain strong ohmic contacts on reducible metal-nonmetal compounds.

A more specific object is to permit the formation of such contacts on metallic oxides and sulfides.

The foregoing and other objects, features and advantages of the invention will be apparent from the following more particular description of a preferred embodiment of the invention, as illustrated in the accompanying drawings.

Figure 1:
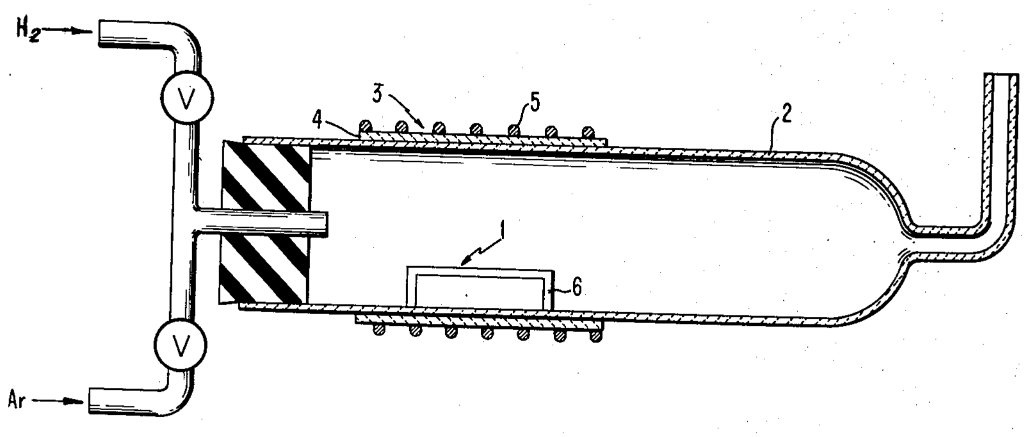
FIG. 1 is a side view of one form of apparatus used with the technique of the present invention.

Considering one embodiment of the present invention and the apparatus employed therewith, as illustrated in FIG. 1, the basic equation which represents the hydrogenic reduction of, for example, the germanium dioxide of the wafer illustrated in that figure is:

$$GeO_2+2H_2 \rightarrow Ge+2H_2O$$

A similar process is applicable to the hydrogenic reduction of the sulfides such as CdS, ZnS, etc. The equation in the latter case for CdS is:

$$CdS+H_2 \rightarrow Cd+H_2S$$

However, the requisite temperature for the above reaction involving CdS is sufficient to volatilize the Cd so that the reverse reaction then takes place leading to deposition of CdS in the colder portion of the reaction tube. This situation can be obviated by producing the metallic Cd by means of an electrolytic reduction at room temperature as will be explained hereinafter.

A typical application of the present invention to the formation of "metallic" contact areas in Ge on a piece of fused $GeO_2$ will be described, but it is be understood that the same basic procedure can be used with other materials which may be in the form of crystals, glasses, fused masses or sintered layers. The other materials may, however, call for slight variations of the basic procedure described below.

Referring now to FIG. 1, there is illustrated a form of reaction apparatus to be used with the technique of the present invention. A piece of fused $GeO_2$ in the form of a polished rectangular "glass" wafer or block labelled 1 is first given a short-dip in white etch, thoroughly washed in distilled water and dried in a nitrogen steam before being placed in the horizontal quartz tube 2. The tube 2 is inserted into a furnace 3, shown schematically on the left, and constituted of a refractory portion 4 and a plurality of windings 5, which windings are connected to a source of power not shown. Initially, argon gas, from a source shown schematically, on the left, is fed into the tube so as to displace the air. The temperature of the furnace is raised to approximately 700° C. and hydrogen gas is then added to the argon stream through a gas-flow indicator and control valve which serve to control the rate of reduction of the $GeO_2$. The gases flow out of the tube on the right as indicated. After about 10 minutes treatment in the $Ar:H_2::3:1$ atmosphere, the hydrogen flow is turned off and the sample allowed to cool in the tube while the latter is flushed with argon.

Figure 2:
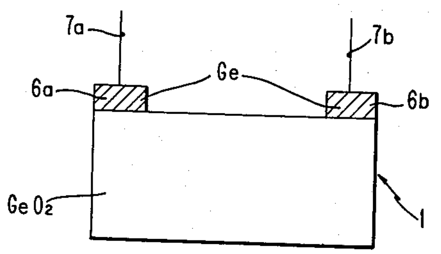
FIG. 2 illustrates one example of a device obtainable by the technique of the present invention.

A layer 6 of germanium is formed on the surface of the block 1, as indicated in FIG. 1. The undesired portions of the layer 6 are removed from the block 1, for example, by gentle filing or by well-known photo-resist and etching techniques so as to produce two end or "cap" contacts *6a* and *6b* as illustrated in FIG. 2. If necessary, the contact areas could be polished to a mirror finish with a fine abrasive. If required, the wafer and contact areas can be doped at this stage by diffusion or other well-established techniques.

It will be understood that, although in FIG. 2, for purposes of illustration, there is shown a sharp transition between the $GeO_2$ bulk material and the "cap" contacts *6a* and *6b* of germanium, there actually exists a graded region between the bulk material and the top of the contacts *6a* and *6b*, that is, there is produced a deviation in stoichiometry between pure $GeO_2$ and pure Ge in the formation of the structure of FIG. 2. Wire leads *7a* and *7b* are soldered to the contact areas in the usual manner.

The application of a potential difference to the wires *7a* and *7b*, after activating the exposed area of $GeO_2$ by exposure to $ZnCl_2$ vapor at 600° C., shows that the block 1 behaves as a satisfactory photoconductor. Attempts to pull the leads off the block indicated a high degree of adhesion of the leads and ultimately led to a fracture of the block at the middle portion.

As mentioned hereinbefore, the procedure, which has been described above in connection with the formation of germanium on a $GeO_2$ block in order to produce satisfactory ohmic contacts, is also applicable to other oxides and to the sulfides of some conductive elements. However, it is not applicable to the formation of metallic contact areas where the material is CdS, since at the temperature required for the reaction, the metallic Cd would be volatilized. Therefore, an electrolytic reduction process at room temperature is utilized for materials such as CdS.

Initially, inferior temporary contacts are made to localized areas of the CdS crystals by rubbing the chosen areas with a liquid alloy of gallium and indium. This alloy is found to wet the surfaces of most suitable materials such as a wide variety of metals, semiconductors and insulators including oxides, glass, plastics, etc. A pressure contact is applied to the wetted area and the area to be reduced electrolytically is brought in contact with an 8% solution of KOH. A potential difference of some 90 volts is applied between the temporary Ga-In contact on the CdS wafer and an inert Pt or C electrode suitably disposed in the KOH solution. This potential difference caused a current to flow through the circuit with the CdS wafer acting as the negative electrode. With high resistivity CdS the illumination of the area in contact with the KOH, by means of a light from an incandescent filament, slowly increases the current up to 10–40 ma./cm.² at which stage the light is turned off with only a slight drop in current.

The current flow, which is obtained due to the arrangement described heretofore, leads to the reduction of the surface area of the CdS wafer in contact with the KOH. The resulting layer of Cd that is produced at the surface could not be rubbed off by strong abrasion with filter paper. This layer had a resistance of less than 1 ohm/square.

The temporary Ga-In contact is wiped off and the pressure contacts can then be applied to the reduced Cd areas on the wafer.

It will be apparent to those skilled in the art that, although several examples of materials have been chosen to illustrate particular applications of the principle of the present invention, the technique is also applicable to the metallic selenides and tellurides as well as to a wide variety of other compounds which are constituted of a conductive element and a nonmetal and are reducible to the conductive element.

While the invention has been particularly shown and described with reference to a preferred embodiment thereof, it will be understood by those skilled in the art that various changes in form and details may be made therein without departing from the spirit and scope of the invention.

What is claimed is:

1. A method of providing ohmic contacts on a wafer constituted solely of $GeO_2$ so that said wafer may be utilized in an electrical circuit by suitable attachment of electrical leads comprising the steps of, positioning said wafer in a zone of a reaction container, heating said wafer, introducing hydrogen into said container whereby said hydrogen chemically reduces the entire surface of said wafer to convert a thin layer on said surface of said wafer of $GeO_2$ to Ge, removing undesired portions of the layer so formed to provide at least two spaced contacts and attaching electrical leads to said at least two contacts.

2. A method as defined in claim 1 wherein said zone is heated to a temperature of approximately 700° C. for a period of approximately 10 minutes.

References Cited in the file of this patent

UNITED STATES PATENTS

| | | |
|---|---|---|
| 2,599,751 | Federspiel | June 10, 1952 |
| 2,602,763 | Scaff et al. | July 8, 1952 |
| 2,957,238 | Harvey et al. | Oct. 25, 1960 |

FOREIGN PATENTS

| | | |
|---|---|---|
| T10,363 | Germany | Aug. 23, 1956 |
| 807,297 | Great Britain | Jan. 14, 1959 |